United States Patent [19]

Iyer

[11] 4,143,022

[45] Mar. 6, 1979

[54] FOUNDRY RESIN COMPOSITIONS COMPRISING FURFURYL ALCOHOL AND A COPOLYMER OF STYRENE AND ALLYL ALCOHOL

[75] Inventor: Rajaram Iyer, Park Forest, Ill.

[73] Assignee: Foseco Technik AG, Zug, Switzerland

[21] Appl. No.: 862,912

[22] Filed: Dec. 21, 1977

[30] Foreign Application Priority Data

Dec. 21, 1976 [GB] United Kingdom ............... 53379/76

[51] Int. Cl.$^2$ ............... C08K 3/36; C08L 61/06; C08K 5/05; B22C 1/22
[52] U.S. Cl. ............... 260/30.4 SB; 164/43; 260/29.15 B; 260/30.4 R; 260/33.4 R; 260/395 B; 260/42.53; 260/829; 264/219; 526/347
[58] Field of Search ............ 260/395 B, 30.4 R, 829, 260/33.4 R, 29.15 B, 30.45 SB, 67 FA, DIG. 40, 42.53; 264/219; 164/43; 526/347

[56] References Cited

U.S. PATENT DOCUMENTS

| | | | |
|---|---|---|---|
| 2,940,946 | 6/1960 | Shokal et al. ..................... | 526/347 |
| 3,024,215 | 3/1962 | Freeman et al. .................. | 260/42.53 |
| 3,454,418 | 7/1969 | Forsberg .......................... | 260/33.2 R |
| 3,557,033 | 1/1971 | Brinton ............................ | 260/33.4 R |
| 3,594,345 | 7/1971 | Brown et al. .................... | 260/67 FA |
| 3,597,386 | 8/1971 | Brabander ........................ | 260/829 |
| 3,681,286 | 8/1972 | Brown et al. .................... | 260/67 FA |
| 3,734,936 | 5/1973 | Brown et al. .................... | 260/37 R |
| 3,993,117 | 11/1976 | Chevriot et al. ............... | 260/DIG. 40 |
| 4,033,925 | 7/1977 | Anderson ........................ | 260/42.53 |
| 4,045,385 | 8/1977 | Klein et al. ..................... | 260/395 B |

Primary Examiner—Herbert J. Lilling
Attorney, Agent, or Firm—Cushman, Darby & Cushman

[57] ABSTRACT

Resin compositions suitable for use in the bonding of particulate refractory material, such as sand, in the production of metal casting cores and molds is provided wherein the composition is composed of furfuryl alcohol and a copolymer of styrene and allyl alcohol. The copolymer is capable of forming a stable homogeneous solution with the furfuryl alcohol. The composition may further contain a silane to promote adhesion of the resin composition as well as an acid catalyst.

15 Claims, No Drawings

FOUNDRY RESIN COMPOSITIONS COMPRISING FURFURYL ALCOHOL AND A COPOLYMER OF STYRENE AND ALLYL ALCOHOL

This invention relates to resin compositions and particularly to furane resin compositions for use in the bonding of particulate refractory material, such as sand, in the production of metal casting cores and moulds.

Known acid-hardenable resins for use in core and mould production include urea-formaldehyde — furfuryl alcohol resins, phenol - formaldehyde resins, phenol-formaldehyde — furfuryl alcohol resins and furfuryl alcohol — formaldehyde resins.

All these resins include formaldehyde as a reactive component and invariably the resins contain appreciable concentrations of unreacted or free formaldehyde which is extremely pungent and may irritate the eyes, respiratory tract and skin. Exposure to formaldehyde in the foundry generally occurs when the free formaldehyde is liberated during mixing of the sand, resin and an acid hardener, and during transfer of the mixed sand to mould or core boxes.

Synthetic resins in which phenol is a reactive component often contain appreciable concentrations of unreacted or free phenol. Although phenol in the atmosphere may be a less serious problem in a foundry compared with formaldehyde it is nevertheless liberated during sand mixing and transfer, and can be absorbed into the body via the skin. In addition phenol poses a dermatitic threat when the resin is handled.

Nitrogenous materials such as urea are undesirable in foundry resins since they have adverse metallurgical effects. When metal is cast against sand containing such resins the nitrogenous materials decompose to form oxides of nitrogen which may dissolve in the metal and result in what is known in the art as "pinhole" defects in the cast metal.

It has now been found that resins which are suitable for producing foundry moulds and cores, which have essentially zero levels of free formaldehyde and free phenol, and which are nitrogen free, can be made from a mixture of furfuryl alcohol and a copolymer of styrene and allyl alcohol.

According to the present invention there is provided a resin composition comprising furfuryl alcohol and a copolymer of styrene and allyl alcohol.

The invention also provides a composition for the production of foundry sand moulds and cores which comprises a mixture of particulate refractory material, a resin composition comprising furfuryl alcohol and a copolymer of styrene and allyl alcohol, and an acid catalyst.

The invention also comprises a method of making a foundry mould or core, which method comprises mixing together particulate refractory material, a resin composition comprising furfuryl alcohol and a copolymer of styrene and allyl alcohol, and an acid catalyst, forming the resulting mixture to the desired shape, and causing or allowing the shape to harden.

Preferably the resin composition contains 65 - 95% by weight of furfuryl alcohol and 5 - 35% by weight of a copolymer of styrene and allyl alcohol.

Suitable styrene - allyl alcohol copolymers containing various proportions of styrene and allyl alcohol, and of various molecular weights are commercially available. Resins with number average molecular weights in the range 1150 to 1600 (weight average molecular weight 1700 - 2300) are preferred.

The resin composition may be prepared by mixing together the furfuryl alcohol and the copolymer of styrene and allyl alcohol while heating, for example to 60° - 65° C, to form a homogeneous, stable solution.

In order to promote adhesion of the resin composition to a sand substrate it may be desirable to include in the composition a silane such as gamma-aminopropyltriethoxy silane ($H_2N\ CH_2\ CH_2\ CH_2\ Si\ (OC_2H_5)_3$) or other amino-functional silane. When used the silane will usually be added in the range of 0.05 - 0.5% by weight of the resin composition.

The resin composition may also contain a proportion of another resinous component. It is preferred to incorporate only resins which will not introduce free formaldehyde, free phenol or nitrogen, for example a homopolymer of furfuryl alcohol, but resins such as plenol-formaldehyde resins, urea - formaldehyde resins and alkyd resins may be added if desired. For example in applications where "pinhole" defects in metal castings are unlikely to result from the presence of nitrogen, the resin composition may contain a proportion of urea - formaldehyde resin.

The resin composition may be "coldset" by the addition of an acid catalyst. Suitable acid catalysts include paratoluenesulphonic acid, benzene sulphonic acid, cumene sulphonic acid, xylene sulphonic acid, sulphuric acid, phosphoric acid and mixtures thereof. Thus when the resin compositions are used to produce foundry moulds or cores, particulate refractory material, such as silica sand, zircon sand, chromite sand or alumina sand, resin composition and acid catalyst are mixed together and the mixture is formed to shape in a mould or corebox. The mixture is then allowed to harden or set at ambient temperature.

The following examples will serve to illustrate the invention:

EXAMPLE 1

A resin composition according to the invention was prepared by dissolving 10 parts by weight of a styrene - allyl alcohol copolymer of molecular weight 2500 in 90 parts by weight of furfuryl alcohol at 60° C. The resulting solution was allowed to cool to room temperature and 0.2 parts by weight of gamma-aminopropyltriethoxy silane were added and thoroughly mixed into the solution.

The resin composition was then tested as a binder for foundry sands.

100 Parts by weight of Ottawa silica sand (AFS Fineness No. 55) were mixed with 1.5% by weight of the resin composition, and 15% to 25% by weight based on the weight of the resin composition of a 70% by weight solution of benzene sulphonic acid in methanol.

Standard AFS tensile test cores were prepared from the sands and tensile strength was determined after the cores had been allowed to cure at ambient temperature for various periods of time. In all cases the "set time" (time required for the resin composition to cure sufficiently for the cores to be stripped from the core box) was determined, and in the case of sands containing 15% by weight of the resin composition of the benzene sulphonic acid catalyst solution the "bench life" was also determined. In determining "bench life" tensile test cores were prepared at various intervals of time after the sand had been mixed, and tensile strength was determined after the cores had been allowed to harden at ambient temperature for 24 hours. In practice a test core prepared "X" minutes after mixing of the sand and achieving approximately 70% of the strength achieved by a test core prepared immediately after mixing of the sand is considered adequate for normal foundry use, and in this case the bench life of the sand will be "X" minutes.

The results obtained are tabulated below:

| % Catalyst (% of binder) | 15% | 20% | 25% |
|---|---|---|---|
| % Resin (% of sand) | 1.5% | 1.5% | 1.5% |
| Sand Temperature - °C | 23 | 21 | 19 |
| Ambient Temperature - °C | 22 | 19 | 17 |
| Set Time (minutes) | 20 | 15 | 12 |
| Bench Life (minutes) | 5 | | |
| Tensile Strength (psi) | | | |
| 1 hour | 145 | 150 | 155 |
| 2 hours | 250 | 240 | 215 |
| 4 hours | 265 | 300 | 270 |
| 6 hours | 270 | 325 | 270 |
| 24 hours | 275 | 355 | 345 |

EXAMPLE II

A resin composition A according to the invention was prepared by dissolving 33.3 parts by weight of the styrene - allyl alcohol copolymer of Example I in 66.7 parts by weight of furfuryl alcohol at 60° C. The resulting solution was allowed to cool to room temperature and 0.2 parts by weight of gamma-aminopropyltriethoxy silane were added and thoroughly mixed into the solution.

A second resin composition B not according to the invention was prepared by mixing together 36.7 parts by weight of a phenol-formaldehyde resole resin of phenol : formaldehyde ratio approximately 0.43 : 1, and 67.3 parts by weight of furfuryl alcohol. 0.2 parts by weight of gamma-aminopropyltriethoxy silane were added and thoroughly mixed into the resin composition.

The resulting composition had a free formaldehyde content of 1.8% by weight.

The performances of the two resin compositions A and B as binders for foundry sands were compared using the procedures described in Example I.

The results obtained are tabulated below:

| % Catalyst (% of binder) | | 15.0 | | 20.0 |
|---|---|---|---|---|
| % Resin (% of sand) | | 1.50 | | 1.50 |
| Sand Temperature - °C | | 19.0 | | 18.0 |
| Ambient Temperature - °C | | 17.0 | | 17.0 |
| Set Time (minutes) | Binder A | Binder B | Binder A | Binder B |
| | 25 | 32 | 13 | 17 |
| Bench Life (minutes) | 5 | 6 | | |
| Tensile Strength (psi) | | | | |
| 1 hour | 155 | 125 | 125 | 165 |
| 2 hours | 190 | 190 | 160 | 225 |
| 4 hours | 200 | 220 | 210 | 245 |
| 6 hours | 230 | 225 | | |
| 24 hours | 250 | 270 | 275 | 300 |

The table shows that when used to bond foundry sands the resin compositions of the invention gives results similar to those produced using a conventional phenol - formaldehyde - furfuryl alcohol resin composition but without the disadvantages associated with the presence of free phenol and free formaldehyde.

I claim:

1. A resin composition for use in the production of foundry moulds and cores, which composition comprises furfuryl alcohol and a copolymer of styrene and allyl alcohol said copolymer being capable of forming a homogeneous, stable solution with furfuryl alcohol.

2. A resin composition according to claim 1 which contains 65 to 95% by weight of the furfuryl alcohol and 5 to 35% by weight of the copolymer of styrene and allyl alcohol.

3. A resin composition according to claim 1 which is prepared by mixing together the furfuryl alcohol and the copolymer of styrene and allyl alcohol while heating to form a homogeneous, stable solution of the copolymer in the alcohol.

4. A resin composition according to claim 3, wherein the heating is to a temperature of from 60° to 65° C.

5. A resin composition according to claim 1 which includes 0.05 to 0.5% by weight of a silane.

6. A resin composition according to claim 5, wherein the silane is gamma-aminopropyltriethoxy silane.

7. A resin composition according to claim 1 which includes a homopolymer of furfuryl alcohol.

8. A composition for the production of foundry moulds and cores, which composition comprises a mixture of particulate refractory material, a resin composition according to claim 1 and an acid catalyst.

9. A composition according to claim 8, wherein the acid catalyst is selected from the group consisting of paratoluenesulphonic acid, benzene sulphonic acid, cumene sulphonic acid, xylene sulphonic acid, sulphuric acid, phosphoric acid and mixtures thereof.

10. A composition according to claim 8 wherein the particulate refractory material is selected from the group consisting of silica sand, zircon sand, chromite sand and alumina sand.

11. A method of making a foundry mould or core, which method comprises mixing together a particulate refractory material, furfuryl alcohol, a copolymer of styrene and allyl alcohol, and an acid catalyst, forming the resulting mixture to the desired shape, and causing or allowing the shape to harden.

12. A method according to claim 11, wherein the acid catalyst is selected from the group consisting of paratoluenesulphonic acid, benzene sulphonic acid, cumene sulphonic acid, xylene sulphonic acid, sulphuric acid, phosphoric acid and mixtures thereof.

13. A method according to claim 11 wherein the particulate refractory material is selected from the group consisting of silica sand, zircon sand, chromite sand and alumina sand.

14. A method according to claim 11, wherein the mixture is formed to shape in a mould or core-box and allowed to harden at ambient temperature.

15. A foundry mould or core when made by a method according to claim 11.

* * * * *